United States Patent [19]

Danielsen et al.

[11] Patent Number: 5,030,400
[45] Date of Patent: Jul. 9, 1991

[54] PROCESS AND AN APPARATUS FOR AGGLOMERATION OF A POWDERY MATERIAL

[75] Inventors: Svend Danielsen, Hedehusene; Per Holm, Vanlose; Gjelstrup H. Kristensen, Vedbaek; Torben Schaefer, Hvalso, all of Denmark

[73] Assignee: A/S Niro Atomizer, Soborg, Denmark

[21] Appl. No.: 545,006

[22] Filed: Jun. 28, 1990

[30] Foreign Application Priority Data

Jul. 3, 1989 [DK] Denmark .............................. 3290/89

[51] Int. Cl.$^5$ .............................................. B29B 9/08
[52] U.S. Cl. .................................. 264/101; 23/313 R; 23/313 FB; 118/303; 264/117; 425/143; 425/222; 427/213
[58] Field of Search ................ 264/117, 101; 425/222, 425/143, 144; 23/313 R, 313 FB; 118/303; 427/212, 213

[56] References Cited

U.S. PATENT DOCUMENTS

| | | | |
|---|---|---|---|
| 3,687,717 | 8/1972 | Philip | 118/303 |
| 4,037,794 | 7/1977 | Melliger | 241/52 |
| 4,062,641 | 12/1977 | Houmand et al. | 425/6 |
| 4,073,838 | 2/1978 | Barnickel et al. | 264/37 |
| 4,111,371 | 9/1978 | Melliger | 241/18 |
| 4,623,098 | 11/1986 | Motoyama et al. | 241/46.04 |
| 4,713,248 | 12/1987 | Kjornaes et al. | 427/3 |
| 4,716,041 | 12/1987 | Kjornaes et al. | 427/3 |
| 4,740,390 | 4/1988 | Külling | 427/213 |
| 4,772,193 | 9/1988 | Glatt | 425/222 |
| 4,895,733 | 1/1990 | Imanidis et al. | 427/8 |
| 4,897,029 | 1/1990 | Seltmann et al. | 425/222 |

FOREIGN PATENT DOCUMENTS 1454743  1/1969  Fed. Rep. of Germany ...... 264/117

OTHER PUBLICATIONS

WO 88/01904, Mar. 1988.
Holm, P., "Effect of Impeller and Chopper Design on Granulation in a High Speed Mixer", *Drug. Dev. Ind. Pharm.*, 13 (1987), 1675.
Kristensen, H. G. and Schaefer, T., "A Review on Pharmaceutical Wet-Granulation", *Drug. Dev. Ind. Pharm.*, 13, (1987), 803.
Schaefer, T.; Bak, H. H.; Jaegerskou, A.; Kristensen, A.; Svensson, J. R.; Holm, P.; and Kristensen, H. G., "Granulation in Different Types of High Speed Mixers", *Pharm. Ind.*, 48, 9, 1083-1089 (1986).
Schaefer, T.; Bak, H. H.; Jaegerskou, A.; Kristensen, A.; Svensson, J. R.; Holm, P.; and Kristensen, H. G., "Granulation in Different Types of High Speed Mixers", *Pharm. Ind.*, 49, 3, 297-304 (1987).
Schaefer, T.; Holm, P.; and Kristensen, H. G., "Comparison Between Granule Growth in a Horizontal and a Vertical High Speed Mixer", *Arch. Pharm. Chem., Sci. Ed*, 1986, 14, 1-16 and 17-29.
Kristensen, H. G.; Holm, P.; and Schaefer, T., "Mechanical Properties of Moist Agglomerates in Relation to Granulation Mechanisms", *Powder Technology*, 44 (1985) 227-237 and 239-247.
Holm, P.; Schaefer, T. and Kristensen, H. G., "Granulation in High-Speed Mixers", *Powder Technology*, 43 (1985) 225-233.

*Primary Examiner*—Mary Lynn Theisen
*Attorney, Agent, or Firm*—Armstrong, Nikaido, Marmelstein, Kubovcik & Murray

[57] ABSTRACT

By agglomeration in a high speed mixer spherical granules having a desired granule size distribution are obtained by supplying the agglomeration liquid by means of an atomizer wheel axially positioned in the high speed mixer and by controlling the quantity and evaporation of said liquid in consideration of the changes occurring with respect to water binding ability of the agglomerates during compaction. An apparatus for carrying out the method includes a mixer bowl with an impeller on a central shaft through the bottom of the bowl and an atomizer with an atomizer wheel with its shaft in alignment with the shaft of the impeller.

14 Claims, 1 Drawing Sheet

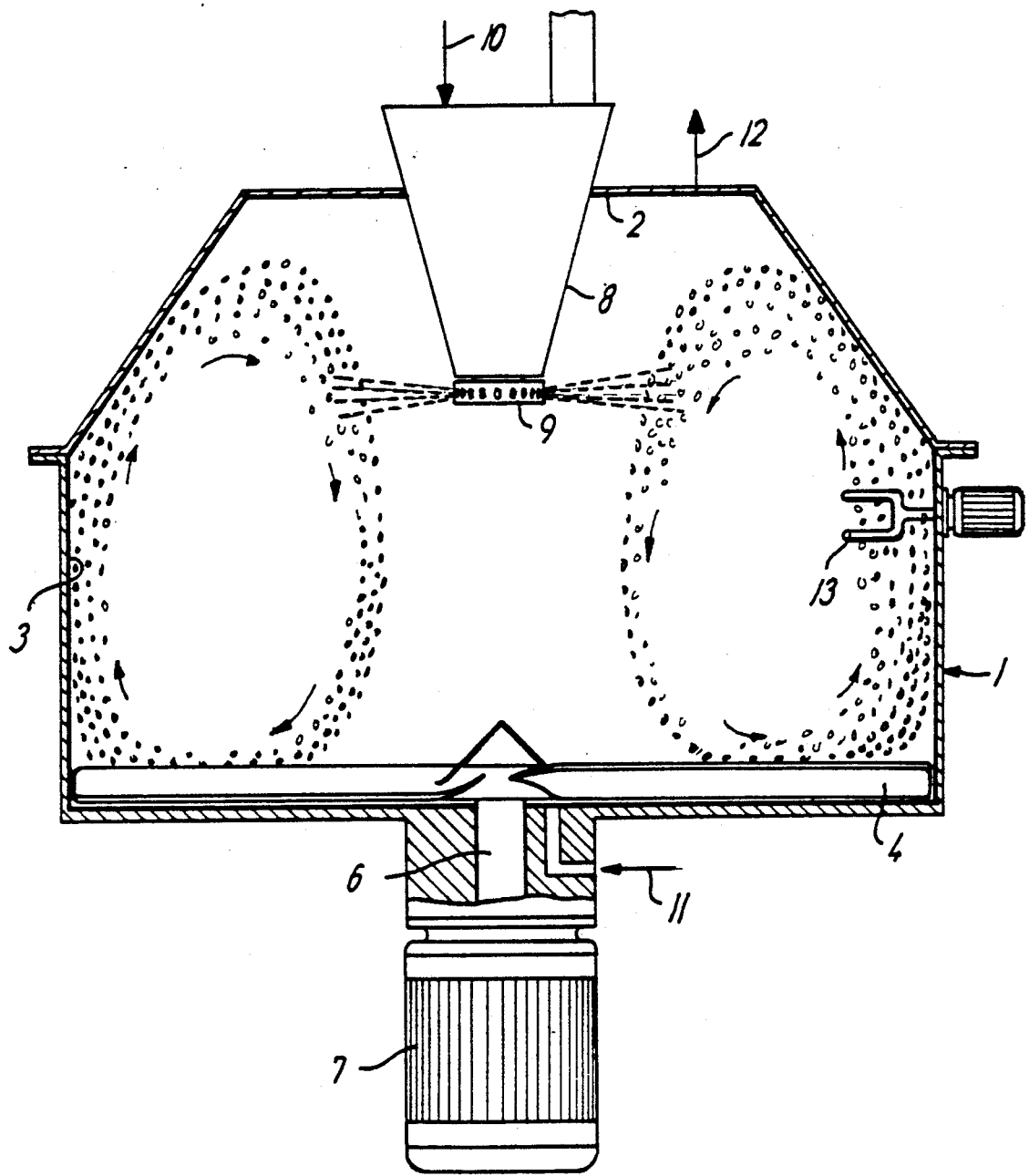

PROCESS AND AN APPARATUS FOR AGGLOMERATION OF A POWDERY MATERIAL

BACKGROUND OF THE INVENTION

The invention relates to a process for agglomeration of a powdery material to obtain spherical granules of a desired narrow granule size distribution with a low intragranular porosity in which the material in a high speed mixer internally coated with a substance to which the materials to be agglomerated and the auxiliary substances required for the agglomeration only have little adhesion, preferably a fluorine-containing polymer, while being mechanically agitated is sprayed with a liquid that is a solution of a binder or a solvent for a binder mixed in the powdery material and then mechanically processed to form and compact granules, which are dried.

Inter alia, in the pharmaceutical industry there is a considerable need for converting powdery drugs or drug-containing mixtures into so-called pellets, i.e. agglomerates, having a uniform granule size with an average diameter between about ½ mm and 2 mm. Such pellets are suited for tabletting, as content of capsules and for the preparation of multiple unit doses, i.e. preparations having controlled release rate of the drug, the pellets being provided with a coating for controlling the release rate of the medicament, as described e.g. in U.S. Pat. Nos. 4,718,248 and 4,716,041.

Various methods of converting powders into pellets have been practiced. Thus, use is made of agglomeration in a fluidized bed, or extrusion of the powder after mixing with a binder solution and a finishing treatment of the extrudate with a view to rounding off the particles in a process called spheronization. Plasticizing auxiliary substances are normally added in such methods, e.g. micro-crystalline cellulose in amounts up to about 50%.

With particular respect to the preparation of pellets to be used for medicaments having controlled release rate it is, moreover, desirable to obtain pellets that are more compact, i.e. less porous, than those obtained according to said two prior art methods, thereby allowing tabletting without considerably influencing the release rate from the pellets. In case of high-dosage formulations it is further desirable to pelletize pharmaceutical substances having a drug content in pellets that is greater than the about 60% made possible according to known methods. These types of methods are, moreover, complicated to carry out, since they comprise many process steps and are therefore difficult to transfer to production scale.

In view of the above, great interest attaches to processes of the type recited in the first paragraph of the present specification. Methods of this type are flexible, require only relatively modest investments and make it possible to obtain very compact agglomerates appropriate in the preparation of multiple unit dose formulations having a very large content of active pharmaceutical agent.

A more specific description of agglomeration by using a high speed mixer is to be found in the following literature:

P. Holm: Drug. Dev. Ind. Pharm. 13, 1675–1701, (1987).

H. Gjelstrup Kristensen and T. Schaefer: Drug. Dev. Ind. Pharm. 13, 803 (1987).

T. Schafer, H. H. Bak, A. Jegerskou, A. Kristensen, J. R. Svensson, P. Holm and H. G. Kristensen: Pharm. Ind. 48,9, 1083–1089 (1986) og 49, 3, 297–304 (1987).

T. Schaefer, F. Holm og H. G. Kristensen: Arch Pharm. Chem. Sci. Ed. 14, 1–29, (1986).

H. O. Kristensen, P. Holm and T. Schaefer: Powder Technology 44, 227–287 and 239–247 (1986).

P. Holm, T. Schaefer and H. O. Kristensen: Powder Technology 48, 213–233 (1985).

U.S. Pat. Nos. 4,037,794 og nr. 4,111,371 (both Melliger).

The commercially available high speed mixers used in the agglomeration processes of the type concerned are round-bottomed or flat-bottomed bowls with a mixer device, designated impeller or mixing blade, rotating about a central shaft close to the bottom and which possibly also follows the lower portion of the lateral walls of the bowl. Most commercial bowls include, moreover, a so-called chopper consisting of some, very fast rotating arms or knives, typically inserted through the lateral wall or the cover of the mixer bowl. The bowl is also provided with means for supplying a binder solution, e.g. in the form of a nozzle accommodated in the bowl cover and intended to spray an atomized solution on a smaller area of the powder mass moving in the apparatus during the operation thereof.

Some of the commercially accessible high speed mixers for carrying out agglomeration operations are intended to provide a moist granulate necessitating drying in a fluidized bed, in a micro-wave drier or on drier trays, while others, e.g. those disclosed in the above two referenced US patents, make it possible to dry the material during processing by flowing drying air through the mixer bowl.

Even though methods of agglomeration by use of a high speed mixer may, as stated, entail advantages in comparison with other methods of granulation they suffer, however, from the drawback that it has not so far been possible to accomplish them so as to obtain in a reproducible manner, a high yield of fractions with a desired granule size distribution. Particularly, the preparation of multiple unit dose formulations requires a very narrow granule size distribution and particles which do not fall within the fixed limits of granule size must be strained off and discarded or fed back, possibly after grinding.

The first one of the above references (P. Holm) suggests covering the wall of the mixer bowl with polytetrafluoroethylene to obtain more uniform results, but high speed mixers with such a coating have not been used industrially.

SUMMARY OF THE INVENTION

It has now turned out that a high yield of agglomerated particles with a desired narrow granule size distribution and with low porosity may be obtained in a reproducible manner according to a process of the kind concerned, characterized by the following steps:

(i) maintaining in a first phase, in which the liquid spraying is effected, the mechanical processing at such a low level that no considerable agglomeration or compaction takes place and no substantial increase of temperature in the material occurs, (ii) distributing in this first phase the liquid uniformly on the material by atomization with an atomizer wheel axially positioned in the mixer, and (iii) adjusting the quantity of liquid to be atomized onto the material to be larger than the quantity sufficient to saturate the agglomerates after compaction, but smaller than the amount required to saturate the material prior to compaction, and by (iv) effecting the compacting stage in a subsequent phase by using a substantially stronger mechanical processing than that practised during the liquid addition and at an increased temperature, preferably between 30° C. and 100° C., and (v) simultaneously ensuring an evaporation of the applied liquid or components thereof by using drying gas or vacuum in unison with the decreasing liquid binding capacity of the agglomerates during their compaction, thereby completely preventing a higher liquid content in the material than the one corresponding to saturation.

By making use of the above enumerated combination of measures (i) to (v) it is actually ensured, on one hand, that the material has a uniform moisture content throughout the powder mass during the entire compacting stage and, on the other hand, that larger liquid drops are at no time in contact with the powder which would result in an extremely non-uniform agglomeration and compaction.

Measure (i) ensures that no compaction is effected before the liquid is dispersed completely uniformly in the powder mass. Two factors are essential to this dispersion, viz. the mechanical agitation and the distribution of the liquid during the very application thereof.

The distribution of the liquid by atomization with an atomizer wheel as stated under item (ii) causes the atomized liquid drops to be incorporated with the powder mass in an extremely uniform manner as explained in more detail in the following.

In this respect an atomizer wheel is more appropriate than nozzles. Thus, the prior apparatuses practising liquid supply by nozzles either provide a far more concentrated spraying on the powder in a confined area at one side of the bowl, or the nozzles provide such an atomization that they hit also the central portion of the bowl bottom where substantially no powder is present, thereby forming here big liquid drops that are difficult to disperse in the powder mass when the mechanical processing thereof is kept at a low level as desired in order to avoid compaction before the liquid is dispersed.

As regards two fluid nozzles the further drawback turns up that they cause the injection of a considerable amount of pressurized air with resulting evaporation of liquid during the liquid addition phase, which evaporation is difficult to determine beforehand and therefore reduces the reproducibility of the process.

Measures (iii) and (v) are based on the recognition that the liquid content in the powder mass during at least part of the compacting step should be in the proximity of the amount of liquid capable of saturating the material but, as stated, must not exceed this amount, and that the ability of the material to bind liquid is considerably reduced during the compacting stage.

This means that the prior art processes, according to which the material is only dried after compaction or according to which the drying is effected without considering this circumstance and for instance is initiated already during the liquid supply phase, as outlined in the above referenced U.S. Pat. No. 4,111,371, involve a considerable risk of causing a local or general occurrence of liquid in an amount exceeding the one corresponding to saturation of the material which makes it impossible to obtain the desired agglomerate.

The liquid is preferably atomized on the material in an amount corresponding to 60% to 95% of the amount necessary to saturate the material prior to compaction.

The drying mentioned under item (v) may be obtained by blowing air through the material while being processed, in which case the drying intensity is controlled by monitoring the amount and/or temperature of the drying air. This control may preferably be effected automatically on the basis of signals, for instance based on the moisture content in the exhaust flow of drying air and/or changes in the consumption of energy used by the impeller.

Alternatively, or as a supplement to the application of drying air, the evaporation of the solvent of the liquid during compaction is obtained by providing vacuum in the mixer bowl.

The invention further relates to an apparatus for carrying out the described method, said apparatus comprising a mixer or agglomerator bowl axially symmetrical about a vertical axis and provided with a cover, said bowl being internally coated with a substance to which the materials to be granulated and the auxiliary substances necessary for the agglomeration have poor adhesion, preferably a fluorine-containing polymer, and having an impeller secured on a central shaft through the bottom of the bowl, said apparatus according to the invention being characterized in that it, affixed in the bowl cover, includes an atomizer with a horizontal atomizer wheel the shaft of which is in alignment with said central shaft.

This apparatus makes it possible to distribute the liquid particularly uniformly across the powder mass, even at relative low rotational speed of the impeller so as to keep the mechanical influence of the powder at such a low level that no considerable compaction is effected during the liquid spraying phase, and so that no non-uniform results of agglomeration occur in the powder mass, as explained above.

The atomizer wheel is of a design known per se and of the type particularly applicable in spray driers. Besides the emphasized advantage that is due to the very homogeneous distribution of the liquid, inter alia because the moistening is effected all the way round on a level with the circumference of the wheel, an atomizer wheel presents, in comparison with a nozzle, the particular advantage that it is capable of atomizing much varying amounts of liquid while simultaneously producing constantly a comparatively fine atomization.

Use is preferably made of either polytetrafluoro-ethylene (PFTE) or a copolymer of tetrafluoroethylene and hexafluoropropylene (FEP) for the internal coating of the bowl.

With a view to obtaining an efficient contact between the drying air and the contents in the apparatus during compaction, the apparatus may be provided with means for controlled injection of drying air around the shaft to which the impeller is secured. Bearing structures allowing such an air injection are known.

For use in connection with vacuum drying the bowl is made airtight and connected with a vacuum source.

BRIEF DESCRIPTION OF THE DRAWING

The drawing is a schematic and partial sectional illustration of an embodiment of the apparatus according to the invention.

DETAILED DESCRIPTION OF THE INVENTION

The invention will now be explained in more detail with reference to the drawing.

In the drawing 1 designates a mixer bowl comprising in the illustrated embodiment cylindrical walls and a flat bottom and a detachable cover 2.

The bowl and the cover are internally provided with a coating 3 of a substance to which the materials to be agglomerated and the auxiliary materials necessary for the agglomeration have a poor adhesion, as explained above.

A mixing and processing device designated an impeller 4 rotates close to the bottom of the bowl, said impeller including two or more inclined blades. The impeller is affixed to a shaft 6 driven by a powerful electric motor 7.

Cover 2 of the bowl accommodates an atomizer 8 with a horizontal atomizer wheel 9. The atomizer is positioned centrally of the cover so that wheel 9 horizontally is equally spaced apart from the walls of the bowl in all directions.

The atomizer has a supply conduit 10 for agglomerating liquid, i.e. a solution of a binder or a solvent for a binder which prior to the supply of liquid is mixed in solid state with the material to be agglomerated.

A bearing provided with a supply conduit 11 for drying air is very schematically illustrated around shaft 6.

An outlet 12 for drying air that has passed the moist material during the compacting stage is illustrated in the cover of the bowl.

A so-called chopper 13 is accommodated in the bowl cover or, as illustrated, in the wall of the bowl, a great rotational speed being imparted to said chopper by a motor located on the external surface of the wall, with the purpose of decomposing lumps that might have been formed during the moistening of the powder mass. Such a chopper is generally used in known high speed mixers for granulation purposes, but the uniform and controlled processing of material effected by the method according to the invention does not make such a chopper absolutely necessary.

In a preferred embodiment of the apparatus according to the invention also impeller 4 has a coating (not shown) of a substance to which the materials to be agglomerated and the auxiliary materials required for the agglomeration are only poorly adhesive, preferably a fluorine containing polymer, which coating, however, does not cover the circumferential portion of the impeller extending into the area in which most of the powdery material is present during the operation of the apparatus. It has in fact turned out that such an impeller only partially coated is capable of processing the material more effectively than is a completely coated impeller, since the non-coated surfaces offer a greater frictional actuation than the coated ones.

Obviously, the internal coating is exposed to a certain wear due to the particles passing along the surface at high velocity. When the bowl has a vertical wall portion and a horizontal bottom portion, as depicted, especially the surfaces at the lower part of the wall and the part of the bottom adjacent thereto are subjected to a substantial abrasion. However, since the action of particles passing at high velocity prevents the adhesion of particles to said surfaces no coating is required there, and in a preferred embodiment the internal coating 3 is therefore partially replaced by a polished, annular steel lining having a vertical portion covering the lower part of the wall of the bowl and a horizontal portion covering an annular area of the bottom adjacent to the wall.

In carrying out the method according to the invention the powder to be agglomerated is introduced into the mixer bowl, following which cover 2 is fastened. The impeller is then switched on, typically at a rotational speed of a few hundred revolutions per minute, and the chopper typically at a speed of 1000 to 2000 rpm.

By the influence of the impeller a vortex movement is imparted to the powder mass which while rotating in the rotational direction of the impeller is effecting a circling movement, as schematically shown in the drawing, the particles being ejected by the impeller towards the walls of the bowl and pressed upwards therealong, following which they return to the lower portion of the bowl at some distance from the walls. In the vicinity of the rotational axis of the bowl only very little powder is present.

After the described pattern of movement has been accomplished the atomization of the agglomerating liquid is initiated by means of atomizer wheel 9. As indicated, the atomized droplets of the liquid hit the powder mass uniformly in an annular area which the powder is passing while moving downwards.

The amount of applied liquid is determined by previous calculations or knowledge of the liquid binding ability of the actual powder material.

When the liquid atomization is finished, chopper 13 is arrested and is possibly removed.

The rotational speed of the impeller is the increased, e.g. three times, and drying air is injected through conduit 11 which drying air passes up through the mixer bowl in order to ensure drying of the material therein, and the obtained agglomerates are concurrently compacted. The drying air and the vapours it entrains are discharged through 12 and preferably subjected to a filtration before release to atmosphere.

The compaction phase typically ranges between some few minutes till 10 to 15 minutes. To obtain compact granules it is advantageous that the processing in this phase is more vigorous than possible with the prior art apparatuses.

An approximate expression of the vigorousness of the mechanical processing is the ratio between the volume through which the impeller travels every second and the volume of the bowl (designated "relative swept volume"). The size of said "swept volume" is calculated by dividing the area of each of the impeller blades into vertical segments and based thereof and on the impeller velocity calculating the volume the impeller blades travel through per second.

It has turned out that the dimensions of the impeller and the capacity of its drive means may preferably be so that during the operation of the apparatus it it possible to obtain that the value of "relative swept volume" is at least 3.0 which is more than generally achieved by prior art apparatuses. This requires particularly that drive motor 7 of the impeller is especially powerful if very compact granules with a narrow granule size distribution shall be obtained in a short time of processing.

During processing the temperature of the material will rise due to the frictional heat. The temperature of the contents in the bowl may advantageously be controlled by certain measures, such as means for preheating the drying air and the provision of cooling or heating jackets around the bowl.

The method and the apparatus according to the invention and the advantages obtained thereby over and above the prior art will be further illustrated by the following examples and tests of comparison.

EXAMPLES

Calciummonohydrogenphosphate having 2 mol crystal water was used as the powdery material for the agglomeration in all examples and tests of comparison. In all cases an 8% aqueous solution of Kollidon 90 (BASF) (polyvinylpyrrolidone) was used as liquid.

The examples were carried out in an apparatus, as described above in connection with the drawing, having a cylindrical diameter of 50 cm and a height of the mixer bowl of 25 cm. The impeller has two blades. Atomization was performed using an atomizer wheel having a diameter of 50 mm and having 4 ejection ducts. The wheel was driven by an air turbine using an air pressure of 3 bar and the speed was 20000–25000 rpm, dependent on the load.

The tests of comparison were carried out by using the commercially accessible apparatus that has the greatest resemblance to the apparatus used in the examples according to the invention. Said prior apparatus is marketed under the name Fielder PMAT 25 VG. Its diameter is 38 cm and its height 21 cm. The liquid injection is effected by using a downwards directed two fluid nozzle disposed non centrally in the cover of the apparatus.

The Homogeneity of the Liquid Distribution

Five examples and one test of comparison were carried out using the liquid addition rates and impeller velocity as stated below in Table I.

Each example made use of 10 kg calciumhydrogenphosphate and 1950 g agglomeration liquid.

To make an estimate on the liquid distribution ten samples of about 5 g were in each example or test taken from different positions in the bowl. The drying loss of each of these samples was measured. The relative standard deviation of the drying losses was used as a measurement of the homogeneity of the liquid distribution. Screen analyses on the dried powder samples were effected. An increase of the average granule size, of the contents of agglomerates greater than 2 mm and of the reduction of the contents of particles smaller than 125 μm indicates an initiating agglomeration. As explained above, such an agglomeration taking place without the conditions therefor being uniform, is undesired.

TABLE I

| Ex. | Liquid Add. g/min | Impeller Rate rev./min. | $s_{rel}$ drying loss (1) | $d_{gw}$ μm (2) | <125 μm % | >2 mm % |
|---|---|---|---|---|---|---|
| 1 | 200 | 100 | 1.4 | 130 | 48 | 1.3 |
| 2 | 200 | 200 | 0.8 | 70 | 75 | 0.7 |
| 3 | 300 | 100 | 3.6 | 101 | 58 | 1.8 |
| 4 | 300 | 200 | 0.6 | 72 | 72 | 0.4 |
| 5 | 400 | 200 | 1.0 | 93 | 62 | 0.6 |
| Test of Comp. | 200 | 200 | 8.1 | 215 | 38 | 14.3 |

(1) i.e. relative standard deviation of the drying losses (percentage).

(2) $d_{gw} = \text{antilog} \frac{\Sigma w_i \cdot \log d_i}{\Sigma w_i}$ wherein $d_i$ is the mean diameter of the ith screen fraction and $w_i$ is the weight amount of the fraction with the mean diameter $d_i$.

It appears from Table I that by Examples 1 to 5 carried out by the method according to the invention, a far smaller variation of the drying loss was obtained and thus a far more uniform liquid distribution than by the test of comparison, and it likewise appears from the three last columns of the Table that the said Examples only showed a slight tendency to agglomeration compared to the results of the test of comparison.

GRANULE SIZE DISTRIBUTION AND YIELD 10 kg calciumhydrogenphosphate and 2100 g 8% aqueous Kollidon 90-solution were used in each of the following Examples 6 and 7 as the starting material, while the test of comparison made use of 1680 g of the aqueous Kollidon-solution and 8 kg calciumhydrogenphosphate, i.e. the same ratio of liquid to powder material.

During the liquid addition phase 200 g liquid per minute was applied in all cases, and in the Examples as well as in the test of comparison the impeller velocity was 200 rpm.

During the compaction phase an impeller speed of 600 rpm. was used in the Examples, while the corresponding speed in the test of comparison was 400 rpm., this being the maximum obtainable speed with the apparatus at such charge.

During the compaction phase of Examples 6 and 7 10 m³/h drying air was passed through, whereas this was not possible in the test of comparison.

The test of comparison was further carried out under the circumstances normal for conventional agglomeration in high speed mixers.

Part of the achieved results appear from Table II. As it will be seen, the process carried out in the test of comparison could not be controlled since, after five minutes, an over-moistening of the material took place due to the fact that the compaction had reached such a level that the material could not any longer retain the total amount of supplied water, and due to the fact that this was not removed in unison with the reduction of the water binding ability of the material, such as this was done in the two Examples.

TABLE II

| | Example 6 | | Example 7 | | Test of Comparison | |
|---|---|---|---|---|---|---|
| Compaction Time min. | $d_{gw}$ μm (2) | $s_{gw}$ (1) | $d_{gw}$ μm (2) | $s_{gw}$ (1) | $d_{gw}$ μm (2) | $s_{gw}$ (1) |
| 0 | 98 | 3.4 | 93 | 3.2 | 215 | 4.7 |
| 2 | | | | | 320 | 2.9 |
| 3 | 273 | 2.8 | 275 | 2.6 | | |
| 4 | | | | | 527 | 2.3 |
| 5 | | | | | (*) | (*) |
| 6 | 741 | 1.5 | 738 | 1.5 | | |
| 8 | 976 | 1.4 | 951 | 1.5 | | |

(*) After 5 minutes the material was over-moistened.

(1) $s_{gw}$ is the relative ratio between the median of the distribution ($d_{50\%}$) and ($d_{15.9\%}$) the fractile for the accumulated weight distribution, and is calculated from:

$$\log s_{gw} = \sqrt{\frac{1}{\Sigma w_i} \cdot (\Sigma w_i (\log d_i)^2 - \frac{(w_i \cdot \log d_i)^2}{\Sigma w_i})}$$

wherein $d_i$ and $w_i$ are as defined in the footnote to Table I (2) see the footnote to Table I.

In order to elucidate this further, the measure porosities of agglomerates produced during Example 6 are stated below and from these the corresponding degrees of saturation were determined.

TABLE III

| Compaction Time min. | Porosity ε · 100[1) | Saturation Degree, % (S · 100) | Drying Loss % |
|---|---|---|---|
| 0 | 48 | 47 | 18,8 |
| 3 | 30 | 94 | 17,3 |
| 6 | 26 | 102 | 15,4 |
| 8 | 24 | 102 | 13,9 |

[1)]The porosity is measured by the pycnometer method using mercury as the displacement medium. The measuring is effected at an intrusional pressure of 740 mm Hg, whereby the Hg will penetrate into pores in the granulate larger than about 20 μm. As regards the acutual pellets the pores in the compact agglomerates may be held smaller than 20 μm, and the measuring is thus close to the real porosity.

Due to uncertainty with respect to the measurements of porosity the degree of saturation in two cases exceeds 100%. The rate of drying during compaction was 55 to 60 g/min.

The above mentioned degree of saturation S is defined by the expression.

$$S = \frac{(1 - \epsilon) \delta_S}{\epsilon \cdot \delta_L}$$

ε = the porosity
$\delta_S$ = the density of the starting material
$\delta_L$ = binder solution density
H = the drying loss.

If, in respect of comparison, the degree of saturation is determined when no drying is performed during the compaction in conformity with conventional high speed agglomeration, the following values are obtained on the basis of Example 6:

TABLE IV

| Compaction Time, min. | Degree of Saturation % (S · 100) |
|---|---|
| 0 | 47 |
| 3 | 102 |
| 6 | 124 |
| 8 | 138 |

It will appear from these calculations that the degree of saturation exceeds 100% after compaction for about 4 minutes. This is in conformity with the experience made in the above test of comparison in which the agglomerate after said time was over-moistened momentaneously resulting in uncontrollable agglomerate growth.

The following Table V shows a screen analysis of the agglomerate obtained by Example 6. It appears that the yield of particles with a granule size within the desired range, i.e. between 500 and 1400 μm, amounts to about 82%.

TABLE V

| Diameter μm | Weight Fraction, % | Accumulated % by Weight |
|---|---|---|
| 10 | 0.5 | 0.5 |
| 75 | 0.0 | 0.5 |
| 125 | 0.1 | 0.6 |
| 180 | 0.2 | 0.8 |
| 250 | 0.3 | 1.1 |
| 355 | 1.1 | 2.2 |
| 500 | 10.5 | 12.7 |
| 710 | 38.3 | 50.9 |
| 1000 | 33.5 | 84.4 |
| 1400 | 5.9 | 90.3 |
| 2000 | 1.2 | 91.5 |
| 2830 | 1.4 | 92.9 |
| 4000 | 7.1 | 100.0 |

TABLE V-continued

Average diameter, $d_{gw}$ μm = 956
% > 4 mm  7,1    % ≤ 75 μm  0,5
% > 2 mm  9,7    % ≤ 125 μm  0,6

By comparing the results obtained by the above Examples and by the tests of comparison it will clearly appear that by the use of atomizer wheels for distributing the granulating liquid under the observance of the remaining features characteristic of the method according to the invention, a considerably higher yield of granulate having a desired relative narrow granule distribution is obtained than the yield obtained by the conventional methods in which the yield frequently is lower than 50%.

It should, however, be observed that a contributory reason why an extremely high yield results in the above Example 6, compared to the yield obtained by conventional processes, probably is that the coating of the apparatus entails less adhesion of particles and thus more uniform processing conditions.

What is claimed is:

1. A process for agglomerating a powdery material to obtain spherical granules of a desired narrow granule size distribution with a low intragranular porosity in a high speed mixer having an internal coating which substantially prevents the adhesion thereto of the powdery materials to be agglomerated and the auxiliary substances required for the agglomeration comprising the following steps:
    (i) introducing into the high speed mixer a powder to be agglomerated and, in a first phase, mechanical agitating the power at such a low level that no considerable agglomeration or compaction of the powder takes place and no substantial increase in temperature of the powder occurs,
    (ii) distributing in the first phase a liquid uniformly on the powder by atomization of the liquid with an atomizer wheel axially positioned in the mixer, the liquid being a solution of a binder or a solvent for a binder present in the powder, and
    (iii) adjusting the quantity of liquid to be atomized on the powder to be larger than the quantity sufficient to saturate the powder after compaction, but smaller than the amount required to saturate the powder prior to compaction,
    (iv) effecting compacting in a subsequent phase by using a substantially stronger mechanical agitation than that practiced in the first phase and at an increased temperature, and
    (v) simultaneously ensuring an evaporation of the applied liquid or components thereof by using drying gas or vacuum in unison with the decreasing liquid binding capacity of the powder during compaction, thereby completely preventing a higher liquid content in the powder than the one corresponding to saturation.

2. The process of claim 1, comprising atomizing the liquid on the powder in an amount corresponding to 60% to 95% of the amount necessary to saturate the powder prior to compaction.

3. The process of claim 1 or 2, wherein the liquid is water or an aqueous solution of a binder and the water during the compaction is evaporated by blowing air through the material while being processed.

4. The process of claim 1 or 2, wherein the evaporation of the applied liquid or components thereof is obtained by the use of vacuum during the compaction.

5. An apparatus for agglomerating a powdery material comprising a mixer or agglomerator bowl axially symmetrical about a vertical axis and provided with a cover, said bowl having an internal coating to which powdery materials to be agglomerated and auxiliary substances necessary for the agglomeration have a poor adhesion, and having an impeller secured on a central shaft through the bottom of the bowl, and an atomizer affixed in the bowl cover, the atomizer having a horizontal atomizer wheel and a shaft which is in alignment with said central shaft.

6. The apparatus of claim 5, wherein the dimensions of the impeller and the capacity of its drive means make it possible to obtain a ratio of at least 3.0 of the volume through which the impeller travels per second to the volume of the bowl.

7. The apparatus of claim 5, wherein the impeller has a coating to which the powdery materials to be agglomerated and the auxiliary materials required for the agglomeration only have poor adhesion, said coating covering the impeller except for the peripheral portion of the impeller extending into the area in which most of the powdery material is present during the operation of the apparatus.

8. The apparatus of claim 5 or 6, wherein the bowl has a vertical wall portion and a horizontal bottom portion, wherein the internal coating includes a polished, annular steel lining having a vertical portion covering the lower part of the vertical wall and a horizontal portion covering an annular area of the bottom adjacent to the wall.

9. The apparatus of claim 5 or 6, comprising means for injecting air and means for controlling the injection of drying air around the shaft to which the impeller is secured.

10. The apparatus of claim 5 or 6, wherein the bowl is airtight and is connected with a vacuum source.

11. The apparatus of claim 5 or 6, comprising thermostatically controlled means for adjusting the temperature of the contents in the bowl.

12. The apparatus of claim 5 or 7, wherein the internal coating is a fluorine-containing polymer.

13. The process of claim 1, wherein the internal coating comprises a fluorine-containing polymer.

14. The process of claim 1, wherein the compacting in step (iv) is performed at a temperature between 30° C. and 100° C.

* * * * *